UNITED STATES PATENT OFFICE.

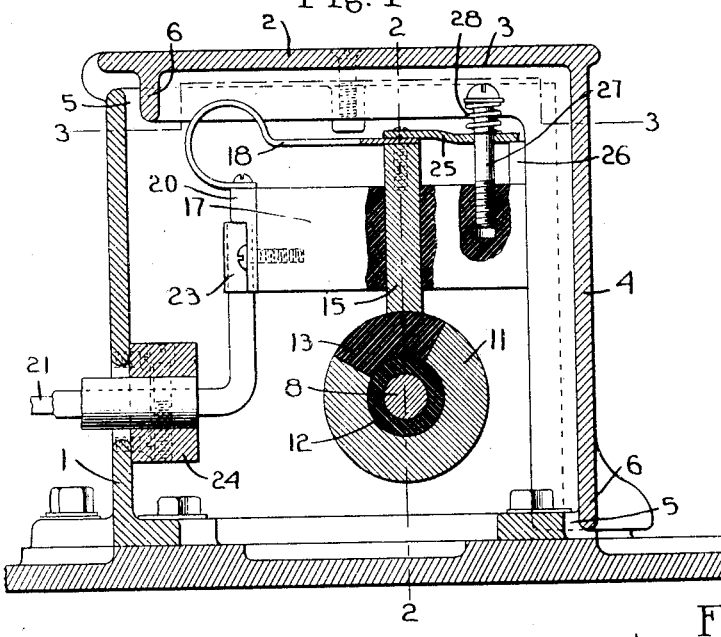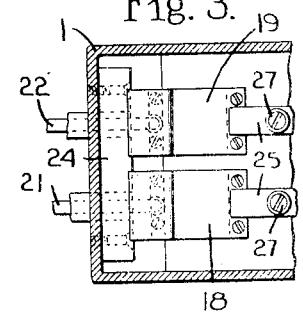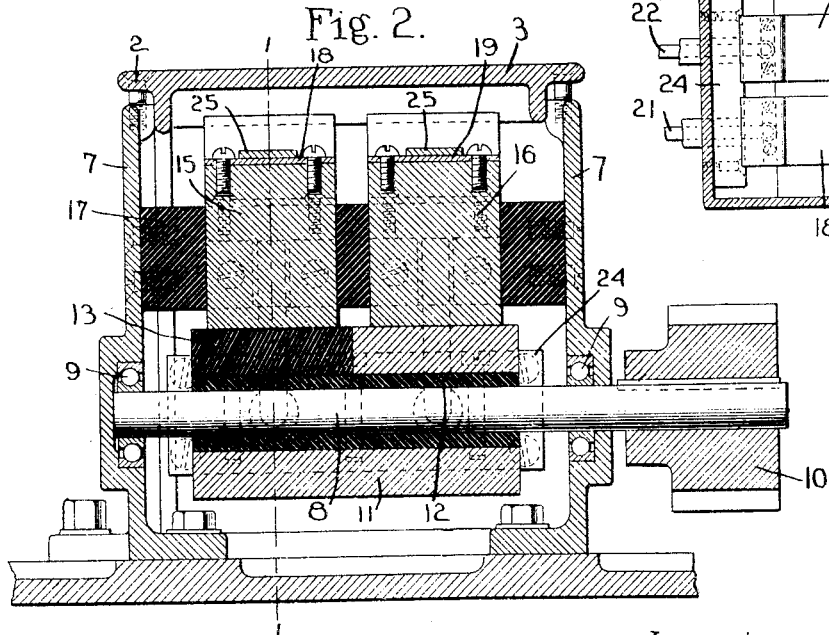

FREDERICK S. STEARNS, OF SWAMPSCOTT, MASSACHUSETTS, ASSIGNOR TO FRANCIS G. GALE, OF WATERVILLE, QUEBEC, CANADA.

CURRENT-REGULATOR FOR ELECTRIC WELDING-MACHINES.

1,349,303.  Specification of Letters Patent. Patented Aug. 10, 1920.

Application filed November 4, 1916, Serial No. 129,428. Renewed November 28, 1919. Serial No. 341,267.

*To all whom it may concern:*

Be it known that I, FREDERICK S. STEARNS, a citizen of the United States, residing at Swampscott, county of Essex, State of Massachusetts, have invented an Improvement in Current-Regulators for Electric Welding-Machines, of which the following description, in connection with the accompanying drawing, is a specification, like characters on the drawing representing like parts.

In operating an electric welding machine, and especially one adapted for welding a seam or a tube progressively by feeding the two pieces to be welded through the machine, it is necessary to maintain an even heat at the welding point in order to produce a perfect weld. The heat produced varies as the current varies, and in welding a seam variations in current are likely to occur due to variations in the resistance at different points of the seam.

For instance, the character of the metal at different points of the seam may vary somewhat, or some oil, grease or other foreign substance may get between the abutting faces at some point thereby varying the resistance at this point. Such variations in resistance will cause variations in the amount of current, and this in turn will result in variation in the heat produced.

In the present machines for electric welding it is customary to provide some switches or rheostats designed to be manipulated by the operator for the purpose of controlling the current and in using the machines, the operator is obliged to watch closely the welding as it proceeds and to manipulate the switches, rheostats or other controlling devices by hand to increase or diminish the current if he finds that the temperature at the welding point is too low or too high.

I have provided herein a device for automatically regulating the current of a welding machine so that a current capable of producing the proper heat will be developed at all times without any manipulation on the part of the operator. I accomplish this by providing a device in the primary circuit of the welding transformer, which device is constructed to open and close the primary circuit alternately. By doing this at proper timed intervals, the required current can be maintained and any surging of the current which might be produced by a sudden decrease of resistance will be prevented.

In order to give an understanding of my invention, I have illustrated in the drawings a selected embodiment thereof which will now be described, after which the novel features will be pointed out in the appended claims.

Figure 1 is a vertical section of a device embodying my invention taken on the line 1—1, Fig. 2;

Fig. 2 is a section taken on the line 2—2, Fig. 1;

Fig. 3 is a horizontal view on the line 3—3, Fig. 1, made on a reduced scale.

The device for making and breaking the circuit is inclosed in a casing so as to give protection from any sparking that might occur. This casing is herein shown as comprising a body portion 1 presenting a bottom and three side walls and a removable cover portion 2 shaped to present a top wall 3 and one side wall 4. The body portion and top are constructed to provide ventilating openings 5, and these openings are screened by the flanges or portions 6 formed on the top so as to prevent any flashes or arcing from being seen.

Journaled in bearings 9 in the side walls 7 of the casing is a shaft 8 which may be rotated from any suitable source of power. I have herein shown it as provided with a gear 10 by which it may be driven. Mounted on the shaft is a commutator element 11 in the form of a cylinder, said cylinder being insulated from the shaft, as shown at 12. This cylinder has a portion 13 at one end thereof formed of insulating material, the remainder of the cylinder being made of copper or some other material having good electrical conductivity.

Coöperating with the cylinder or commutator are two brushes 15 and 16, respectively. The brush 16 rests on the end of the cylinder that is entirely of conducting material, while the brush 15 rests on the end thereof containing the section 13 of insulating material. These brushes may be made in any suitable way, but preferably will be made of a plurality of copper wires grouped together. The brushes are guided in openings formed in a guiding member 17 of insulating material and are secured at their upper ends to spring terminals 18 and 19, respectively. The spring terminal 18 to which the brush 15 is secured is in turn mechanically and electrically connected to the end 20 of a wire 21, and the spring terminal 19 is mechanically and electrically connected to the end of a wire 22. The ends of the wires to which the spring terminals 18 and 19 are connected are clamped to the guiding member 17 by means of clamps 23. The two wires 21, 22 are led out through the side of the casing and are held in position by clamping holders 24 which are secured to the casing. The wires 21, 22 form part of the primary circuit of the welding transformer.

In the operation of the device the rotative movement of the shaft 8 will bring the brush 15 alternately onto the insulated section 13 of the commutator and the body thereof having good conductivity. The brush 16, on the other hand, constantly engages the portion of the commutator having good electrical conductivity. As a result, so long as the brush 15 is on the portion of the commutator formed of conducting material, the primary circuit will be closed through the brushes and the commutator, but as the commutator rotates into the position shown in Fig. 1, so that the brush 15 engages the portion 13 of insulating material, then the circuit will be broken. The section 13 of insulating material will preferably be considerably less in extent circumferentially than the portion having good conductivity so that as the shaft rotates, the circuit will be closed during the greater part of each revolution and will be opened during a relatively small part of the revolution. In operating the device the shaft will preferably be rotated at a speed to cause the circuit to be opened and closed in rapid succession, and this opening of the primary circuit at frequent intervals will act to check any sudden increase of current due to reduced resistance at the welding point and will thus prevent any possibility of burning the metal. The device thus acts automatically and will eliminate the necessity of any hand manipulation of rheostats, switches, etc., for controlling the current.

This device may be used for spot welding by rotating the shaft quite slowly so that the time interval during which the circuit is open will be sufficient to permit the work to be fed from one point to be welded to the next point to be welded.

Means are provided for maintaining the brushes yieldingly in engagement with the commutator, and for this purpose I have provided plates 25 which rest at one end upon ledges 26 rising from the holder 17 and at the other end on the brushes. These plates are maintained in position by screws 27 secured to the guiding member 17 and are acted upon by springs 28 which encircle the screws.

I claim:

1. In a device of the class described, the combination with a casing, of a rotatable shaft journaled therein, a commutator fast on the shaft but insulated therefrom and having at one end a section of insulating material, the rest of the commutator being made of material having good conductivity, two brushes engaging said commutator, one of said brushes having engagement with the section of insulating material, two feed wires, resilient terminals connected to said wires and bearing against said brushes, feed wires and bearing against said brushes, and a spring acting against each terminal and yieldingly holding the corresponding brush against the commutator.

2. In a device of the class described, the combination with a casing, of a rotatable shaft journaled therein, a commutator fast on the shaft but insulated therefrom and having at one end a section of insulating material, the rest of the commutator being made of material having good conductivity, two brushes engaging said commutator, one of said brushes having engagement with the portion of the commutator provided with the section of insulating material, a guiding member of insulating material in which the brushes are slidably mounted, two feed wires, two resilient terminals connected to said feed wires and bearing against said brushes, a plate resting at one end against each brush and at the other end against a fixed projection carried by the casing, and a spring acting on each plate.

In testimony whereof, I have signed my name to this specification.

FREDERICK S. STEARNS.